United States Patent [19]

Elberbaum

[11] Patent Number: 4,943,864
[45] Date of Patent: Jul. 24, 1990

[54] CLOSED CIRCUIT TELEVISION APPARATUS FOR SUPERVISORY SYSTEM

[75] Inventor: David Elberbaum, Tokyo, Japan

[73] Assignee: Elbex Video, Ltd., Tokyo, Japan

[21] Appl. No.: 270,579

[22] Filed: Nov. 14, 1988

[30] Foreign Application Priority Data

Feb. 25, 1988 [JP] Japan .................................. 63-40617

[51] Int. Cl.⁵ ........................ H04N 7/18; H04N 5/268; H04N 7/10
[52] U.S. Cl. .................................... 358/108; 358/86; 358/181; 340/734
[58] Field of Search .................... 358/86, 108, 181, 87; 340/734; 350/183

[56] References Cited

U.S. PATENT DOCUMENTS

| 4,507,683 | 3/1985 | Griesshaber et al. | 358/181 |
| 4,673,974 | 6/1987 | Ito et al. | 358/86 |
| 4,774,570 | 9/1988 | Araki | 358/108 |
| 4,779,134 | 10/1988 | Mak | 358/181 |
| 4,831,438 | 5/1989 | Bellman, Jr. et al. | 358/108 |
| 4,835,613 | 5/1989 | Johnson | 358/183 |

Primary Examiner—John K. Peng
Attorney, Agent, or Firm—Helfgott & Karas

[57] ABSTRACT

A closed circuit television camera for a supervisory system includes a number of transmitting devices which generate video signals and are located at each of a number of different places to be observed, a television receiver which receives the video signals, and a switching device which selects one of the transmitting devices and connects the same to the television receiver. Each transmitting device includes a television camera having a specific code, a circuit for generating code signals and a circuit for generating composite signals. The receiver has a circuit for receiving the composite signals which also extracts the code signals from the composite signals and generates display signals to identify the television camera corresponding to the extracted code signals. Visual information corresponding to the display signals is displayed on a monitor.

7 Claims, 2 Drawing Sheets

CLOSED CIRCUIT TELEVISION APPARATUS FOR SUPERVISORY SYSTEM

BACKGROUND OF THE INVENTION

1. Field of the Invention

This invention relates to a closed circuit television apparatus suitable for a supervisory system.

2. Description of the Prior Art

Generally, as a supervisory system for observation of different locations from a central supervisory station, a closed circuit television apparatus is employed. At each location to be observed, a television camera is used, and at the central supervisory station, a monitor for receiving video signals transmitted from the selected television cameras and a switching device for selectively connecting the television cameras to the monitor are located.

In this type of supervisory system, the attendant must identify the television camera transmitting the video signals corresponding to the image being reproduced on the monitor. For this purpose, in the conventional supervisory system the attendant identifies the television camera by the connection condition of the switching device, but the attendant may occasionally misconceive such connection condition.

Another conventional system, superpose characters on the reproduced image on the monitor. The conventional system however is limited to few characters, furthermore these characters cannot be switched off, removed or having their position shifted from the reproduced image on the receiver or monitor at the monitoring station. The conventional system, therefore, is disadvantaged by the character superpose on top of important object to be surveyed so that said character interrupts the identification of an important portion in the image on the monitor.

SUMMARY OF THE INVENTION

It is therefore an object of the present invention to provide a closed circuit television apparatus, with which it is possible to identify easily and correctly the television camera transmitting the video signals, by generating unrestricted visual alpha numeric characters or illustrative display together with the image or picture being reproduced on a monitor.

According to the present invention, a closed circuit television apparatus comprises a plurality of transmitting means for generating videos signals, a receiving means for receiving the video signals, and a switching means for selectively connecting the transmitting means to the receiving means. Each of the transmitting means includes a television camera to which a specific code is allotted, a circuit for generating code signals corresponding to the specific code, and a circuit for generating a composite signal wherein the code signals are injecting into the video signal. The receiving means includes a circuit for receiving the composite signal, for extracting the code signal from the received composite signal and for generating a display signal pertaining to the television camera corresponding to the extracted code signal, and a monitor or receiver for displaying visually information corresponding to the display signal together with images corresponding to the video signals.

The code signal generating circuit may be a circuit for generating said code signal during one or more desired horizontal scanning period of said television camera.

In the preferred embodiment of the present invention, the code signal generating circuit includes a code setting circuit in which said code is set, a counter for counting the number of horizontal scanning lines of said television camera every field or frame of vertical scanning, and a circuit for generating, when the counted value of the counter is a predetermined value, said code signal corresponding to said code set in said code setting circuit.

The code signal can be a signal having two levels, high which is a white level and low which is a black level of a picture signal in said video signal.

The display signal generating circuit preferably includes a memory for storing said display signal for each of said television cameras, an extracting circuit for extracting said code signal from said composite signals, and a control circuit for reading out the display signal corresponding to said extracted code signal from said memory based on an output signal of said extracting circuit and for supplying said read-out display signal to said receiving means.

The display signal generating circuit preferably includes a memory for storing said display signal for each of said television cameras, an extracting circuit for extracting said code signal from said composite signals, and a control circuit for reading out the display signal corresponding to said extracted code signal, based on an output signal of said extracting circuit, and for supplying said read-out display signal to said receiving means, said extracting circuit including a circuit for counting horizontal synchronizing signals in said video signal every field or frame of vertical scanning, a gate circuit for allowing said composite signals to pass when the counted value of said counting circuit is a predetermined value, and a circuit for reproducing said code signal based on an output signal of said gate circuit.

The reproducing circuit preferably includes a level sensor for reproducing said code signal based on the level of the output signal of said gate circuit.

With the closed circuit television apparatus thus constructed, since character information such as a description of the location of the television camera is generated by the display signal generating circuit based on the code signals transmitted from the television camera, it is possible to easily and correctly identify the image reproduced on the receiver. Further, since the character information corresponding to the television camera is displayed on the receiver based on a code signal transmitted from the television camera being connected to the receiver, it is possible to identify correctly the television camera being connected to the receiver.

BRIEF DESCRIPTION OF THE DRAWINGS

The foregoing and other objects and features of the invention will become apparent from the following description of a preferred embodiment of the invention with reference to the accompanying drawings, in which.

DETAILED DESCRIPTION OF THE PREFERRED EMBODIMENT

Figure 1:
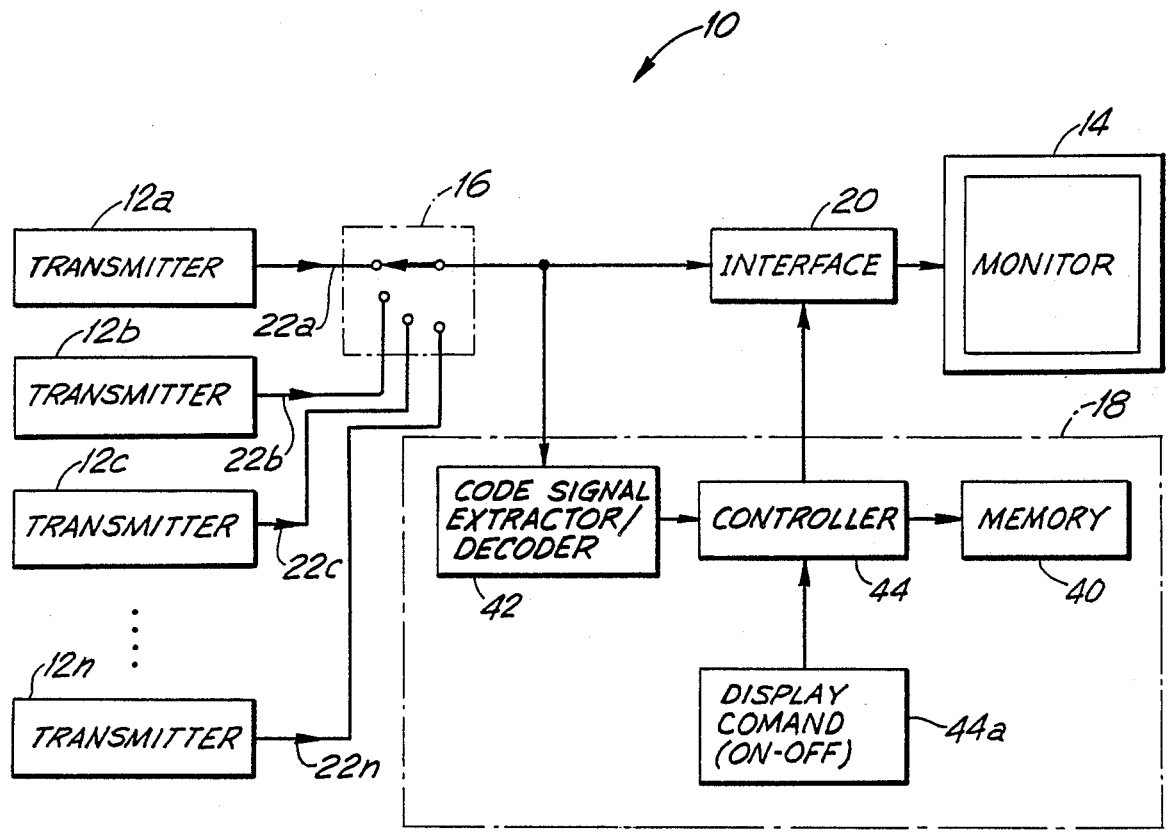
FIG. 1 is a block diagram showing an embodiment of an electrical circuit of a closed circuit television apparatus according to the present invention.

FIG. 1 shows a closed circuit television apparatus 10 for a supervisory system, in which image pick-up devices or transmitting devices 12a, 12b, 12c . . . and 12n for generating respective video signals are located at each of a plurality of different places to be observed. On the other hand, at a central supervisory station, a television receiver or monitor 14 for reproducing an image corresponding to the video signal transmitted from a selected one of the transmitting devices 12a, 12b, 12c . . . and 12n, a switching device 16 for selecting one of the transmitting devices to be connected to the monitor 14, a display signal generating circuit 18 for generating a display signal identifying the transmitting device connected to the monitor 14, and an interface 20 for composing an output signal of the display signal generating circuit 18 with the video signal, are located. Between the central supervisory station and the respective places to be observed, cable-like transmission lines 22a, 22b, 22c . . . and 22n for the transmitting devices 12a, 12b, 12c . . . and 12n are built.

The video signal is a composite signal which is composed by adding a composite synchronizing signal to an image signal. The display signal is a character or illustrative information for visually identifying on the monitor 14 the location observed and the television camera connected to it.

Figure 2:
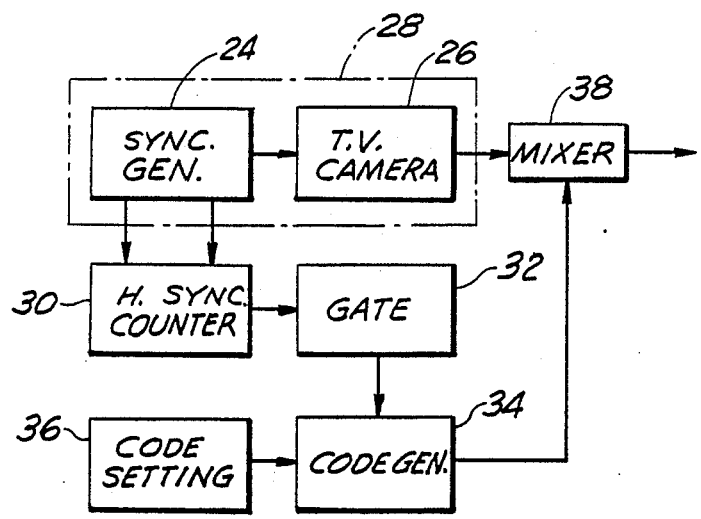
FIG. 2 is a block diagram showing an embodiment of an electrical circuit of a transmitting device.

As shown in FIG. 2, each of the transmitting devices 12a, 12b, 12c . . . and 12n has a known television camera 28 including a synchronizing signal generating circuit 24 and a video signal generating circuit 26. Vertical and horizontal synchronizing signals generated by the synchronizing signal generating circuit 24 are supplied to the video signal generating circuit 26 and a counter 30.

The horizontal synchronizing signal is supplied to an input terminal of the counter 30, and the vertical synchronizing signal is supplied to a clear or reference terminal of the counter 30, whereby the counter counts the number of horizontal scanning lines every field or every frame of the vertical scannings of the television camera 28. The counted value of the counter 30 is supplied to a gate signal generating circuit 32.

The gate signal generating circuit 32 outputs a gate signal to a code signal generating circuit 34 only when the counted value of the counter 30 is a predetermined value, i.e., during a predetermined one or more horizontal scanning period.

The code signal generating circuit 34 is connected to a code setting circuit 36 in which camera codes are set one for each television camera 28. Therefore, only when the gate signal is supplied to the code signal generating circuit 34, the code signal generating circuit 34 outputs to a mixer 38 a code signals corresponding to the code set in the code setting circuit 36.

The codes "1", "2", "3" . . . and "n", for example, are allotted to the television cameras of the transmitting devices 12a, 12b, 12c . . . and 12n respectively.

The code signal generating circuit 34 is a circuit which generates a code signal every line scanning and gates the code signal by the gate signal. But the code signal generating circuit 34 may be an alternative circuit which is operative to generate a code signal only when the counted value of the counter 30 is a predetermined value.

The code signal is a binary or bar code signal having two levels, high or white which is the maximum level of a picture signal in a video signal supplied from the television camera 28 to the mixer 38 and low or black which is the minimum level of the picture signal. Alternatively, the code signal may be a sine-wave signal having a frequency corresponding to the code. This code signal is generated during a period of one or more horizontal scanning line during the vertical blanking period of the video signal or immediately after vertical blanking period.

The mixer 38 superposes the code signal supplied from the code signal generating circuit 34 over the video signal supplied from the television camera 28, and then outputs to a predetermined transmitting line a composite signal of the code signal and the video signal.

The display signal generating circuit 18 extracts the code signal in the composite signal transmitted from the transmitting device, and generates the display signal identifying the television camera corresponding to the extracted code signal. The display signal generating circuit 18 may comprise, for example, a memory 40 for storing display signals indicating the location, the numeral, etc. of the respective television camera, a decoder or extracting circuit 42 for extracting the code signal form the composite signal, and a controller 44 for reading out from the memory 40 the display signal identifying the television camera corresponding to the extracted code signal based on the output signal of the extracting circuit 42 and then supplying this display signal to the interface 20 to superimpose the display signal on the receiver or monitor 14 together with the reproduced image or picture of the corresponding television camera.

The extracting circuit 42 decodes the code signal by utilizing the synchronizing signal transmitted from the transmitting device and by sensing, timing and reading the code signal high and low levels transmitted from the transmitting device.

Figure 3:
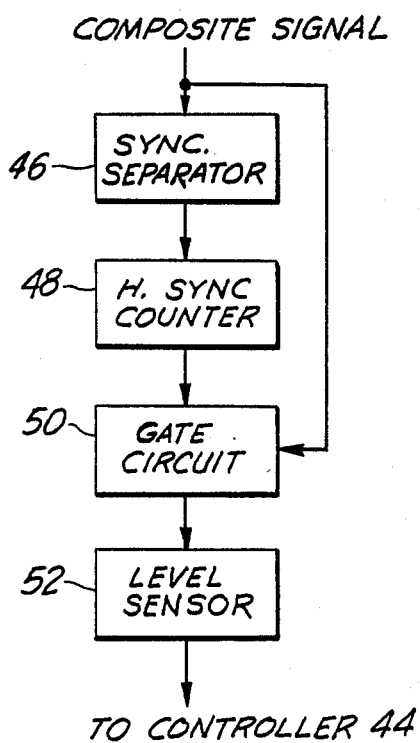
FIG. 3 is a block diagram showing an embodiment of a code signal extracting circuit.

The extracting circuit 42, as shown in FIG. 3, may comprise, for example, a synchronizing signal separating circuit 46 for extracting vertical and horizontal synchronizing signals in the composite signal transmitted from the transmitting device, a counter 48 for counting the number of horizontal line scannings of the television camera 28 every field or frame of the vertical scanning, a gate circuit 50 for outputting the composite signal, which is transmitted from the transmitting device, only when the counted value of the counter 30 is a predetermined value, and a level sensor 52 for sensing a level of the output signal of the gate circuit 50 to reproduce the code signal.

The reproduced code signal is supplied from the extracting circuit 42 to the controller 44. The controller 44 generates the display signal by retrieving and reading out the stored information in the memory 40 corresponding to the code signal reproduced by the level sensor 52.

The display signal supplied from the controller 44 to the interface 20 is superposed on the video signal in the interface 20 so that a character or illustration corresponding to the display signal is displayed on the monitor 14.

The switching device 16 has a plurality of fixed contacts connected to the respective transmission lines 22a, 22b, 22c . . . and 22n, and a movable contact or it may be a commonly available automatic sequencing electronic switching device. One end of the movable contact or the input of an electronic sequencing switcher is selectively connected to one of the fixed contacts, and the other end or the output of an electronic sequencing switcher is connected to the display signal generating circuit 18 and the interface 20.

In the closed circuit television apparatus 10, for example, when the transmitting device 12a is connected to the monitor 14 by the switching device 16, the video signal transmitted from the transmitting device 12a is inputted to the monitor 14 via the switching device 16 and the interface 20, thereby reproducing on the monitor 14 the image or picture derived from the television camera 28 of the transmitting device 12a.

Meanwhile, the code signal corresponding to the television camera 28 of the transmitting device 12a is inputted to the display signal generating circuit 18, which hence supplies to the interface 20 the display signal corresponding to the television camera 28 of the transmitting device 12a. Thus the character or illustration corresponding to the location etc. of the television camera 28 of the transmitting device 12a is displayed on the monitor 14 as superposed on the reproduced picture or image. Accordingly the attendant can identify, from the picture on the monitor 14, the place (to be observed) corresponding to the reproduced image.

It is preferable that the code signal is generated during the blanking period of the vertical retrace of the video signal, whereby the reproduced image is not affected by the code signal, even if the code signal is injected to the video signal, and a clear image or picture can be obtained on the monitor 14. Even if the code is injected immediately after the blanking period, only a minor disturbance can be observed of the black and white bars along single horizontal scanning line.

What is claimed is:

1. A closed circuit television apparatus comprising:
    a plurality of transmitting means for generating video signals;
    a receiving means for receiving said video signals;
    a switching means for selectively connecting said transmitting means to the receiving means;
    each of said transmitting means including a television camera to which a specific code is allotted, a circuit for generating code signals corresponding to said specific code, and a circuit for generating composite signals wherein the code signals are injected into the video signals; and
    said receiving means including a circuit for receiving said composite signals, for extracting said code signals from the received composite signals and for generating display signals identifying the television camera corresponding to the extracted code signals, and a receiver for displaying visually information corresponding to said display signals together with reproduced images or pictures corresponding to said video signals.

2. A closed circuit television apparatus according to claim 1, wherein said code signal generating circuit is a circuit for generating said code signal during one or more desired horizontal scanning period of said television camera.

3. A closed circuit television apparatus according to claim 2, wherein said code signal generating circuit includes a code setting circuit in which said code is set, a counter for counting the number of horizontal scanning lines of said television camera every field or frame of vertical scanning, and a circuit for generating, when the counted value of the counter is a predetermined value, said code signal corresponding to said code set in said code setting circuit.

4. A closed circuit television apparatus according to claim 2 or 3, wherein said code signal is a signal having two levels, high which is a white level and low which is a black level of a picture signal in said video signal.

5. A closed circuit television apparatus according to claim 1, wherein said display signal generating circuit includes a memory for storing said display signal for each of said television cameras, an extracting circuit for extracting said code signal from said composite signals, and a control circuit for reading out the display signal corresponding to said extracted code signal from said memory based on an output signal of said extracting circuit and for supplying said read-out display signal to said receiving means.

6. A closed circuit television apparatus according to claim 3, wherein said display signal generating circuit includes a memory for storing said display signal for each of said television cameras, an extracting circuit for extracting said code signal from said composite signals, and a control circuit for reading out the display signal corresponding to said extracted code signal based on an output signal of said extracting circuit, and for supplying said read-out display signal to said receiving means, said extracting circuit including a circuit for counting horizontal synchronizing signals in said video signal every field or frame of vertical scanning, a gate circuit for allowing said composite signals to pass when the counted value of said counting circuit is a predetermined value, and a circuit for reproducing said code signal based on an output signal of said gate circuit.

7. A closed circuit television apparatus according to claim 6, wherein said code signal is a signal having two levels, high which is a white level and low which is a black level of a picture signal in said video signal, said reproducing circuit including a level sensor for reproducing said code signal based on the level of the output signal of said gate circuit.

* * * * *